US012567783B2

(12) United States Patent
Khaldi et al.

(10) Patent No.: US 12,567,783 B2
(45) Date of Patent: Mar. 3, 2026

(54) MOTOR STARTER WITHOUT CONTACTOR

(71) Applicant: SAUDI ARABIAN OIL COMPANY, Dhahran (SA)

(72) Inventors: Bader S. Khaldi, Anak (SA); Majed M. Hamrani, Dhahran (SA); Omar Alarfaj, Dammam (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 166 days.

(21) Appl. No.: 18/300,158

(22) Filed: Apr. 13, 2023

(65) Prior Publication Data

US 2024/0348125 A1 Oct. 17, 2024

(51) Int. Cl.
H02K 7/20 (2006.01)
H02K 11/26 (2016.01)
H02K 11/40 (2016.01)
(52) U.S. Cl.
CPC ............... H02K 7/20 (2013.01); H02K 11/26 (2016.01); H02K 11/40 (2016.01); *H02K 2211/00* (2013.01)
(58) Field of Classification Search
CPC .......... H02K 7/20; H02K 11/26; H02K 11/40; H02K 2211/00; H02K 11/27; H02P 1/00
See application file for complete search history.

(56) References Cited

U.S. PATENT DOCUMENTS

| | | | | |
|---|---|---|---|---|
| 5,751,132 A | * | 5/1998 | Horvath | G01R 31/343 |
| | | | | 318/490 |
| 5,949,157 A | * | 9/1999 | Hirzel | H01H 3/40 |
| | | | | 307/112 |
| 8,253,517 B2 | | 8/2012 | Weber | |
| 2018/0048142 A1 | | 2/2018 | Immel et al. | |
| 2021/0067070 A1 | * | 3/2021 | Strebel Marzano | H02P 6/28 |
| 2021/0098218 A1 | * | 4/2021 | Elmiger | H01H 50/18 |

FOREIGN PATENT DOCUMENTS

| | | | |
|---|---|---|---|
| CN | 214177196 U | * | 9/2021 |
| EP | 1 317 049 A1 | | 6/2003 |

OTHER PUBLICATIONS

CN214177196U English translation (Year: 2025).*

* cited by examiner

*Primary Examiner* — Christopher M Koehler
*Assistant Examiner* — Viswanathan Subramanian
(74) *Attorney, Agent, or Firm* — Osha Bergman Watanabe & Burton LLP

(57) ABSTRACT

A device for transmitting power includes a Motor Circuit Protector (MCP) and a motorized mechanism. The MCP includes contacts that electrically connect a power supply to a low voltage motor in a closed position, and disconnect the power supply from the low voltage motor in an open position. The motorized mechanism includes a shaft, a controller, and an electric actuator. The shaft is fixed to each of the one or more contacts, and actuates the contacts to the open and closed positions. The controller is electrically connected to the power supply, and processes operating instructions and transfers power to the electric actuator according to the operating instructions. The electric actuator actuates the shaft upon receiving the power, and the low voltage motor rotates when the power supply is connected thereto.

16 Claims, 3 Drawing Sheets

45

13

11

45

13

11

MOTOR STARTER WITHOUT CONTACTOR

BACKGROUND

Low Voltage (LV) motor starters are typically used to both start and stop a motor and/or other downstream load(s), and protect the motor, downstream load(s), and/or a circuit from a short circuit, overload, or power dip. For example, when an LV motor is overloaded, the LV motor starter will actuate, or trip, to open the circuit and prevent electricity from traveling to the motor and associated downstream components. Typically, LV motor starters include components such as (1) a Motor Circuit Protector (MCP), which is used to protect and isolate the circuit from some of the conditions identified above and (2) a contactor with an overload element to provide protection against overload and/or a prolonged loss of power. The MCP also enables controlling the motor and/or downstream load(s) by virtue of being able to open and close the electrical circuit to start and stop the motor.

Typical motor starters include a contactor with a normally energized coil, that actuates under power to maintain continuity within the electrical circuit and keep the motor in a powered state. However, in the event that the power supply is unable to provide power, even for a short duration of time, the contactor will trip and open the circuit, preventing the motor from being powered. The contactor thus requires a perpetual source of power to remain operable, and is susceptible to small dips in the voltage of the circuit, called voltage sags.

SUMMARY

A device for transmitting power includes a Motor Circuit Protector (MCP) and a motorized mechanism. The MCP includes contacts that electrically connect a power supply to a low voltage motor in a closed position, and disconnect the power supply from the low voltage motor in an open position. The motorized mechanism includes a shaft, a controller, and an electric actuator. The shaft is fixed to each of the one or more contacts, and actuates the contacts to the open or closed positions. The controller is electrically connected to the power supply, and processes operating instructions and transfers power to the electric actuator according to the operating instructions. The electric actuator actuates the shaft upon receiving the power, and the low voltage motor rotates when the power supply is connected thereto.

A method for transmitting power includes supplying power from a power supply to a motorized mechanism. The motorized mechanism includes a shaft fixed to contacts of a Motor Circuit Protector (MCP), an electric actuator, and a controller. The method further includes transferring power to the electric actuator according to operating instructions processed by the controller. In addition, the method includes actuating the shaft using power supplied to the electric actuator. This actuates the contacts to an open position or a closed position, where the open position is a position in which the contacts electrically disconnect the power supply from a low voltage motor and the closed position is a position in which the contacts electrically connect the power supply to the low voltage motor. Finally, the method includes rotating the low voltage motor when the power supply is electrically connected thereto.

BRIEF DESCRIPTION OF DRAWINGS

Specific embodiments of the disclosed technology will now be described in detail with reference to the accompanying figures. Like elements in the various figures are denoted by like reference numerals for consistency. The sizes and relative positions of elements in the drawings are not necessarily drawn to scale. For example, the shapes of various elements and angles are not necessarily drawn to scale, and some of these elements may be arbitrarily enlarged and positioned to improve drawing legibility.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not intended to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, one or more embodiments of the disclosure are directed toward a low voltage motor starter without a contactor, also referred to as a contactor-less starter. Specifically, the disclosed invention incorporates the functionality of the contactor and associated coil into an enhanced MCP that includes functions such as overload protection, voltage release, and ground protection. The starter also avoids energy losses associated with the normally energized coil of the contactor, allowing the starter to operate efficiently. Furthermore, the starter is capable of maintaining the MCP in a closed position under low power conditions or momentary power loss, which avoids unnecessary power interruptions to the operating motor or downstream load. Accordingly, this disclosure presents an LV motor starter without a contactor. This arrangement allows the LV motor starter to perform the above mentioned circuit protection features while being immune to power dips and also having a lower operating cost overall.

Figure 1A:
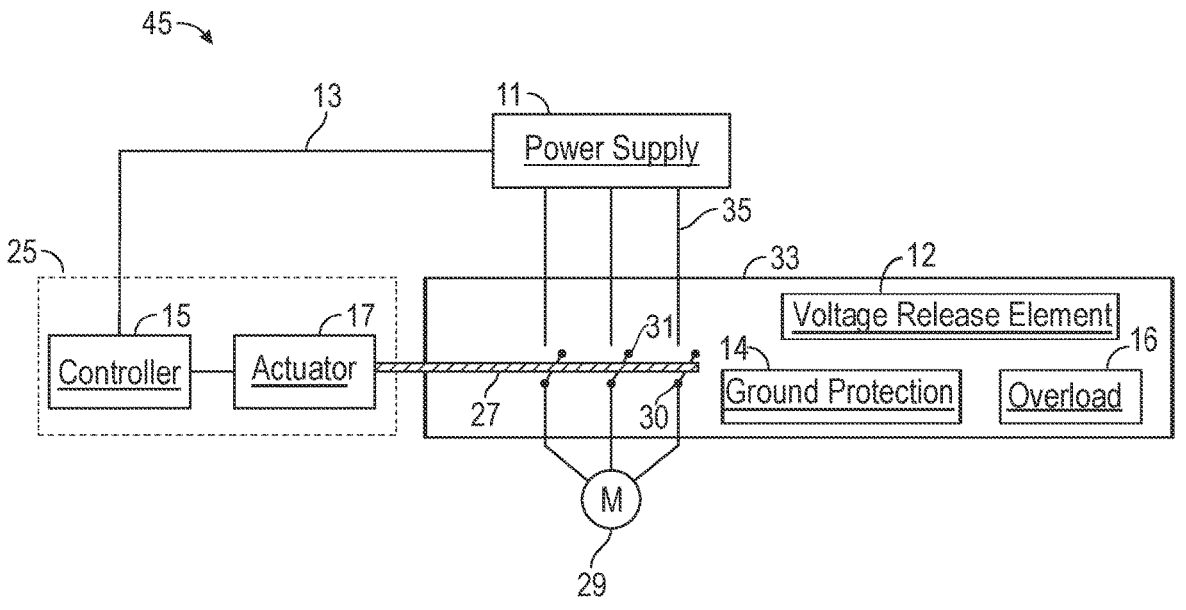
FIGS. 1A and 1B depict a block diagram of an open circuit and a closed circuit, respectively, in accordance with one or more embodiments of the present disclosure.
Figure 1B:
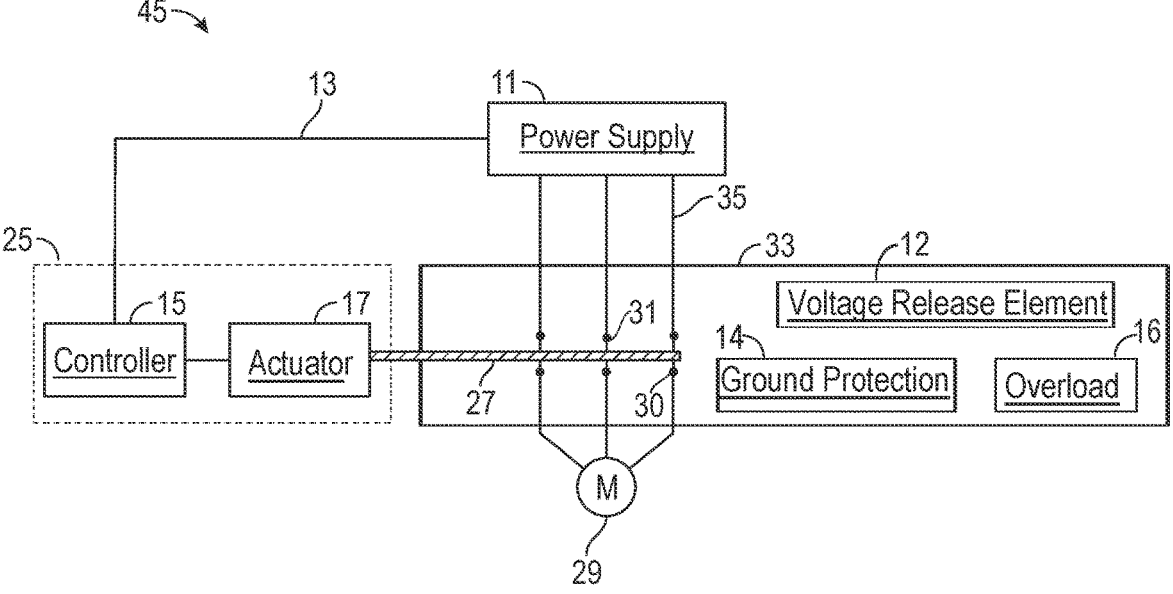

FIGS. 1A and 1B depict embodiments of a motor starter 45 in accordance with one or more embodiments of the present disclosure. As shown in FIG. 1A, the motor starter 45 is powered by a power supply 11, which may be a utility or distributed energy resource. The utility or distributed energy resource may be an oil, coal, or natural gas processing facility, or involve renewable resources such as wind, solar, or geothermal power. The power supply 11 is connected to a motorized mechanism 25 with a wire 13. The wire 13 may be an aluminum, copper, steel, or equivalent metal or alloy wire that is coated or uncoated. At its other end, the power supply 11 has output leads 35, which are metal wires formed of a same or similar material as the wire 13. The output leads 35 connect from the power supply 11 to a series of contacts 31, which are actuated by a shaft 27 of the motorized mechanism 25. The contacts 31 are metal contacts that are actuated to connect and disconnect an electrical circuit, and may be tempered or hardened to increase the durability thereof and prevent wear associated with a duty cycle of the contacts 31. When the series of contacts 31 are actuated from an open position, as shown in FIG. 1A, to a closed position, as shown in FIG. 1B, the power supply 11 is electrically connected to a low voltage motor 29 and transfers power thereto, and the low voltage motor 29 rotates under the supplied power.

The shaft 27 may be formed of one or more metals including steel, aluminum, iron, or an equivalent metal. Alternatively, the shaft 27 may be formed of rigid plastics such as High Density Polyethylene (HDPE), Polycarbonate, Polyvinyl Chloride (PVC), or equivalent rigid polymer. The shaft 27 is fixed to the contacts 31 by way of a brazing or welding process, a sliding pivot connection, a bearing, a pin joint, or equivalent mechanism that allows the linear motion of the shaft 27 to be translated to the contacts 31. The contacts 31 are connected to the low voltage motor 29 with a pivot connection 30, such as a slip ring connector, that allows the contacts 31 to rotate while remaining connected to the low voltage motor 29. Thus, overall, the linear motion of the shaft 27 rotates the contacts 31 about the pivot connection 30, which electrically connects and disconnects the contacts 31 from the power supply 11. As described below, the pivot connection 30 and the contacts 31 form part of a Motor Circuit Protector (MCP) 33.

The motorized mechanism 25 includes a series of components, connected by wires such as the wire 13, that collectively serve to actuate the shaft 27. The motorized mechanism 25 is primarily composed of an electric actuator 17, which is embodied as a motor such as an Alternating Current (AC) motor, a Direct Current (DC) motor, servo motor, solenoid, or equivalent. As one nonlimiting example of a structural embodiment of the motorized mechanism 25, the electric actuator 17 may be connected to the shaft 27 as a rack and pinion mechanism, where the electric actuator 17 has a rotating pinion (or circular gear) that actuates a rack, or splined surface of the shaft 27. Other forms of linearly actuating the shaft 27 may be utilized without departing from the nature of this specification.

The electric actuator 17 is controlled according to operating instructions processed by a controller 15. Operating instructions may include, for example, an amount of power for the controller 15 to supply to the electric actuator 17, and may further include a duration for transmitting the power. Thus, the controller 15 fulfils the operating instructions by supplying power to the electric actuator 17 at a specified power level and period of time. The process of generating the operating instructions is further described below.

The controller 15 includes a logical processing component, such as a microprocessor, Integrated Circuit (IC), processor, a series of logic gates, or equivalent processing unit. The controller 15 also includes components that serve to control the flow and amount of electricity sent to the electric actuator 17, and may include components such as a gate driver, a rectifier, or equivalent control means. The controller 15 may further include components such as a memory storage device (such as Random Access Memory, for example) to store the operating instructions, and a receiver (such as an analog or digital transceiver or a data bus) to receive and transmit the operating instructions.

To measure the voltage being supplied by the power supply 11, the MCP 33 includes a voltage release element 12. Structurally, the voltage release element 12 may be embodied as a circuit including a processor and sensor (or equivalent devices) that are connected to the power supply 11, and may further include an actuator connected directly to the contacts 31, or an element directly connected to the power supply. The sensor of the voltage release element 12 serves to measure system voltage and/or power output by the power supply 11, which is used by the included processor to actuate the MCP 33 and open its contacts. By way of example, the sensor may be embodied as a capacitive or resistive type of sensor, or any other equivalent device. The actuation may be performed by sending a trip signal to the controller 15 as operating instructions, or operating the element connected directly to the power supply 11 to enable shunt trip breaking features.

In the event that the received voltage is less than a predetermined lower limit, the voltage release element 12 retains the MCP 33 in a closed position for a predetermined time duration. For example, the predetermined period of time may be defined to be a short period of time such as 0.1 seconds, 1 second, 5 seconds, or longer, during which the low voltage motor 29 remains connected to the power supply 11 via the MCP 33 that includes the pivot connection 30 and the contacts 31. The predetermined period of time may also be determined according to an operator's or manufacturer's specification, or determined according to the operating conditions of the low voltage motor 29. This, in turn, retains the connection between the power supply 11 and the low voltage motor 29, even though the power supply 11 may be underpowering the low voltage motor 29. During the underpowered period of time, the low voltage motor 29 will continue to rotate under its own inertia, while slowing down briefly. However, because the actuation mechanism 25 remains in the closed position, the low voltage motor 29 is able to return to its normal operating speed at the moment that the power supply 11 resupplies power. Thus, once the power supply 11 returns to supplying a normal power level, the low voltage motor 29 will instantly receive the power and will resume normal operation.

After the predetermined period of time, if the voltage release element 12 still has not received power from the power supply 11, the controller 15 controls the electric actuator 17, causing the shaft 27 to actuate from the closed position of FIG. 1B to the open position of FIG. 1A. Thus, in a case of a permanent power loss or a prolonged voltage dip, the voltage release element 12 will trip the MCP 33 by transmitting signals to the controller 15 or directly actuating the MCP 33. Overall, the built-in voltage release element 12 allows the disclosed motor starter 45 to selectively open the MCP 33 when required and at the same time ride through voltage sags (power dips).

Furthermore, if the voltage release element 12 receives power within the acceptable limits from the power supply 11 (power recovery), the controller 15 controls the electric actuator 17 to actuate to the closed position based upon a command issued by an operator. This allows the motor starter 45 to self-reset under conditions such as prolonged maintenance on the power supply 11. The self-reset function also increases user convenience, as a user will not have to manually actuate the MCP 33 after the power supply 11 resupplies power to the motor starter 45. The self-reset feature ensures that the MCP 33 trips when there is sustained loss of power by having a built-in voltage release feature to selectively open the MCP 33 when required and at the same time ride through voltage sags (power dips).

In addition to the voltage release element 12, the MCP 33 optionally includes a ground protection element 14 and an overload protection element 16. The ground protection element 14 may be embodied, by way of nonlimiting example, as a current sensor that trips the MCP 33 when the ground protection element 14 detects a dangerous (i.e., high) level of ground current. More specifically, the ground protection element 14 provides protection against electrical faults by tripping the MCP 33 if a high level of ground current is detected. The ground protection element 14 may trip the MCP 33 with a dedicated shunting mechanism (not shown) connected to the output leads 35 of the power supply 11, or by transmitting operating instructions to the controller 15. Similarly, the overload protection element 16 includes one or more heat sensing elements (such as a bimetal strip and tripping mechanism, for example) that serve to trip the MCP 33 with a dedicated shunting mechanism or using the controller 15 when the overload protection element 16 detects a high temperature in the output leads 35. Although not depicted, each of the voltage release element 12, ground protection element 14, and overload protection element 16 may be connected to the controller 15 by way of a wire 13.

Overall, FIGS. 1A-1B depict a low voltage motor starter 45 that does not include a contactor ("contactor-less"). As is commonly known in the art, a contactor includes a continuously energized coil that maintains the continuity of the electrical circuit to keep a downstream load in a powered state, and disconnects the electrical circuit when a fault is detected. Due to the fact that the low voltage motor starter 45 does not include a contactor, the voltage release element 12, the ground protection element 14, the overload protection element 16, and the motorized mechanism 25 replace this functionality by providing overload and loss of power protection. Thus, the motorized mechanism 25 and the MCP 33 eliminate the need for a continuously energized contactor, which saves energy and improves the overall efficiency of a motor starter 45.

The ability of the MCP 33 to remain closed during voltage sags also improves the robustness of the motor starter 45 as a whole. Specifically, by retaining the MCP 33 in the closed position for the predetermined period of time, the continuity of operation for the LV motor 29 is less susceptible to voltage changes. However, the MCP 33 is still capable of disconnecting the low voltage motor 29 from the power supply 11 in the event of prolonged power dip or permanent power supply loss using the voltage release element 12. Accordingly, the disclosed motor starter 45 is advantageous by virtue of its robust ability to ride through temporary power dips.

Figure 2:
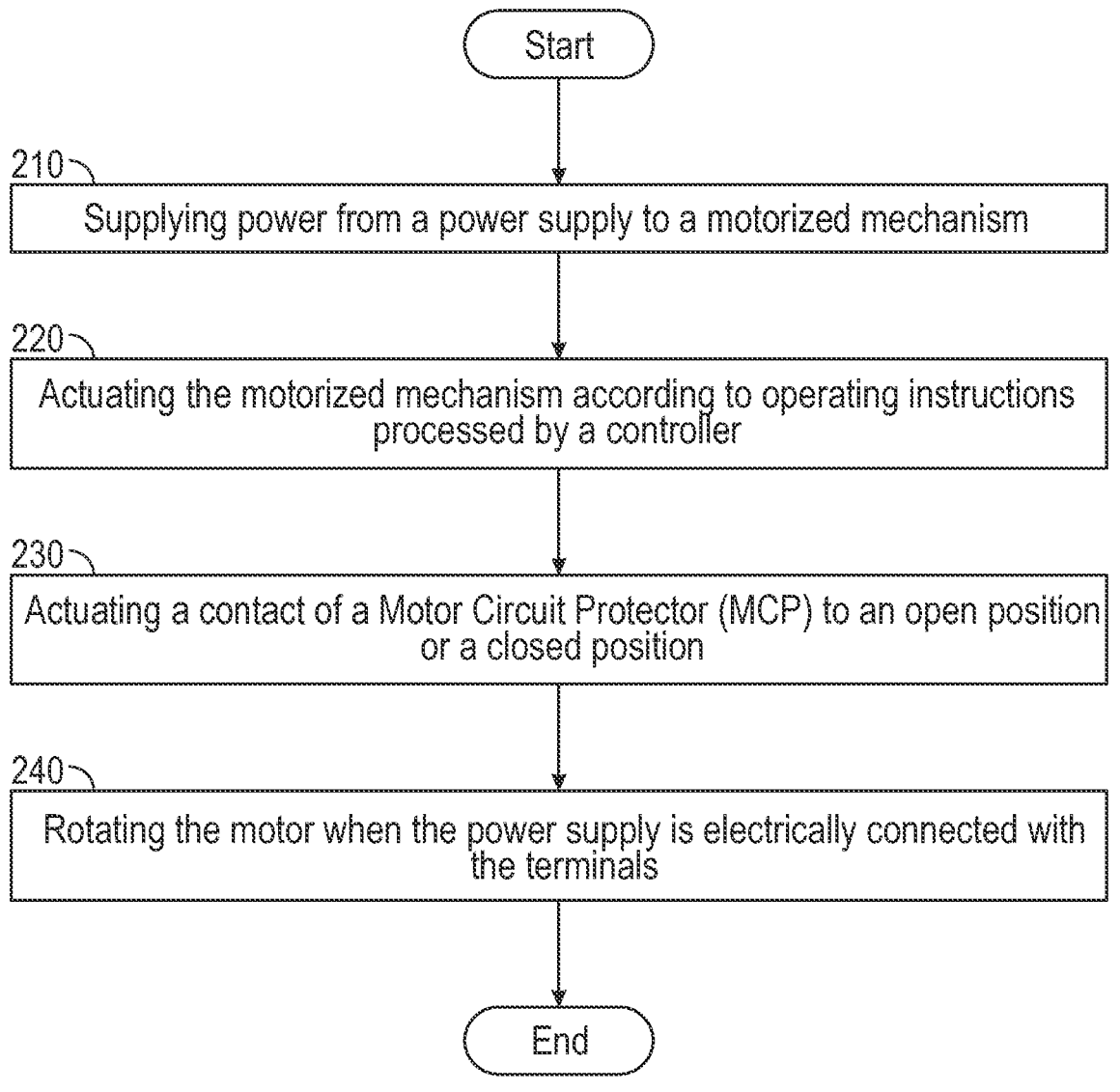
FIG. 2 depicts a flowchart of a method in accordance with one or more embodiments of the present disclosure.
Figure 3:
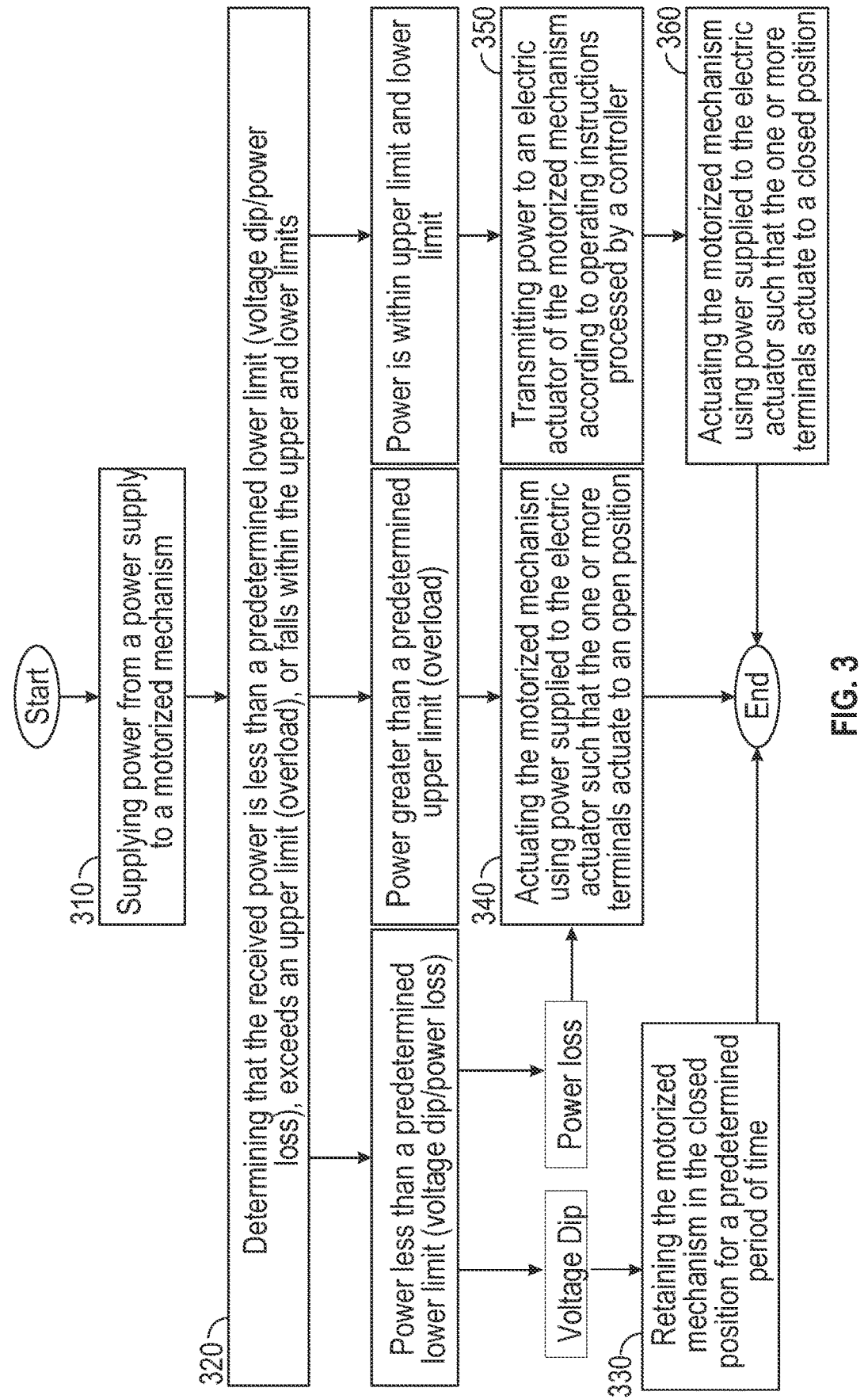
FIG. 3 depicts a flowchart of a method in accordance with one or more embodiments of the present disclosure.

FIGS. 2 and 3 depict methods of transmitting power according to one or more embodiments disclosed herein. While the various flowchart blocks in FIGS. 2 and 3 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

FIG. 2 specifically depicts a method of delivering power to an LV starter motor according to one or more embodiments disclosed herein. The method initiates in step 210, where power is supplied from a power supply 11 to a motorized mechanism 25. The power is supplied by way of a wire 13, for example, that interconnects the power supply 11 and the motorized mechanism 25.

In step 220, the motorized mechanism 25 is actuated based upon operating instructions processed by a controller

15 of the motorized mechanism 25. The controller 15 may receive operating instructions from the voltage release element 12 that senses the voltage output by the power supply 11, for example. Alternatively, if the controller 15 includes a current or voltage sensor, the controller 15 may generate its own operating instructions based upon the detected current or voltage.

As discussed below, the formation of the operating instructions depends upon the voltage detected in the motor starter 45. In the event that the received voltage is less than a predetermined lower limit, the voltage release element 12 retains the MCP 33 in the closed position for a predetermined time duration. This, in turn, retains the connection between the power supply 11 and the low voltage motor 29, even though the power supply 11 may be underpowering the low voltage motor 29. After the predetermined period of time, if the voltage release element 12 still has not received power from the power supply 11, the controller 15 controls the electric actuator 17, causing the shaft 27 to actuate from the closed position of FIG. 1B to the open position of FIG. 1A. Thus, in a case of a total or permanent power loss or a prolonged voltage dip, the voltage release element 12 will trip the MCP 33 by transmitting signals to the controller 15 or directly actuating the MCP 33. Overall, the built-in voltage release element 12 allows the disclose motor starter to selectively open the MCP 33 when required and at the same time ride through voltage sags (power dips).

Furthermore, if the voltage release element 12 receives power within the acceptable limits from the power supply 11, the controller 15 controls the electric actuator 17 to actuate to the closed position. This allows the motor starter 45 to self-reset under conditions such as prolonged maintenance on the power supply 11. The self-reset function also increases user convenience, as a user will not have to manually actuate the MCP 33 after the power supply 11 resupplies power to the motor starter 45. The self-reset feature ensures that the MCP 33 trips when there is a sustained or total loss of power by having a built-in voltage release feature to selectively open the MCP 33 when required and at the same time ride through voltage sags (power dips).

Based upon the operating instructions received from the voltage release element 12 or generated by the controller 15 itself, the controller 15 transmits power to the electric actuator 17 in step 220. This, in turn, causes the electric actuator 17 to operate and actuate the shaft 27 as depicted in step 230. As noted above, the operating instructions include a period of time to transfer power to the electric actuator 17 and an amount or rate of power transferred to the electric actuator 17. Thus, processing the operating instructions includes receiving and interpreting the operating instructions, and transferring power to the electric actuator 17 at the rate and duration specified by the operating instructions. In addition, the operating instructions may be generated by the controller 15 itself, or may be received as a command issued by an operator.

In step 230, the shaft 27 actuates the contacts 31 of the MCP 33 to an open position or a closed position. As noted above, the shaft 27 is fixed to the contacts 31 by way of a brazing or welding process, a sliding pivot connection, a bearing, a pin joint, or equivalent mechanism such that the shaft 27 linearly actuates to rotate the contacts 31. In the open position, there is an air gap present between the output leads 35 of the power supply 11 and contacts 31 of the MCP 33, which prevents power from transferring from the power supply 11 to the low voltage motor 29. In the closed position, the contacts 31 connect to the output leads 35 and the method proceeds to step 240.

In step 240, once the contacts 31 connect to the output leads 35, power is supplied from the power supply 11 to the low voltage motor 29, and the low voltage motor 29 rotates under the supplied power in step 240. Thus, the method is completed by changing the state of the low voltage motor 29 from a state in which the low voltage motor 29 is not powered to a state in which the low voltage motor 29 is receiving power, and can act upon an external load. Alternatively, if the motorized mechanism 25 is used to disconnect the power supply 11 from the low voltage motor 29, the method completes by actuating the contacts 31 to an open position.

FIG. 3 depicts a method for transmitting power according to one or more embodiments disclosed herein. Initially in step 310, power is supplied from a power supply 11 to a motorized mechanism 25. As noted above, a controller 15 of the motorized mechanism 25 is connected to a power supply 11 via a wire 13. Thus, step 310 involves transferring power to the controller 15 via the wire 13.

In step 320, the voltage release element 12 and/or the overload element 16 of the MCP 33 measures the power received from the power supply 11 and compares the received power to a series of predetermined limits. The predetermined limits may be derived from operating conditions of the low voltage motor 29 such as nominal voltage, residual flux decay time, or other operating metrics. In the event that the received power is less than a predetermined lower limit, the method proceeds to step 330. Alternatively, if the level of power is greater than a predetermined upper limit (overload), the method proceeds to step 340. On the other hand, if the level of voltage falls within the predetermined lower limit and the predetermined upper limit, then the method proceeds to step 350.

In step 330, the amount of power measured by the voltage release element 12 is less than the predetermined limit. Such a situation may occur, for example, if the power supply 11 ceases to transmit power or if the power supply 11 undergoes a voltage dip. The MCP 33 behaves differently depending upon if a voltage dip is experienced or if power is lost entirely. Specifically, if a voltage dip is detected by the voltage release element 12, the motorized mechanism 25 controls the electric actuator 17 to remain in the closed position. This, in turn, retains the connection between the power supply 11 and the low voltage motor 29, even though the power supply 11 may be underpowering the low voltage motor 29. Thus, once the power supply 11 returns to supplying a normal power level, the low voltage motor 29 will instantly receive the power and will resume normal operation, at which point the method ends. Alternatively, if a power loss is experienced, the method proceeds to step 340.

In step 340, the overload element 16 determines that the received power is greater than a predetermined upper limit. This means that the received power has the potential to overpower and damage the low voltage motor 29 if the power supply 11 connects to the low voltage motor 29. In such cases, the motorized mechanism 25 is actuated to the open position, preventing power transfer to the low voltage motor 29. Thus, by virtue of the motorized mechanism 25 operating the electric actuator 17 under high levels of power, the motor starter 45 is capable of performing overload protection to disconnect the circuit and prevent damage thereto.

In step 350, the power is determined to be within the predetermined lower limit and the predetermined upper limit, and the motorized mechanism 25 actuates an electric actuator 17 according to operating instructions processed by the controller 15. Specifically, processing the operating instructions includes receiving and interpreting operating instructions that specify a period of time, rate, and/or an intensity of power to output to the electric actuator 17, and transferring power to the electric actuator 17 according to the operating instructions. Once the electric actuator 17 has received power from the controller 15, the method proceeds to step 360.

In step 360, a shaft 27 is actuated by the electric actuator 17 using power supplied by the controller 15. The shaft 27 may be fixed directly to the electric actuator 17 using a brazing or welding process, an adhesive, a mechanical connection such as a set screw, a rack and pinion configuration, or equivalent retention methods. The shaft 27 is also connected to the contacts 31, and actuating the shaft 27 causes the contacts 31 to actuate and connect the power supply 11 to the low voltage motor 29. This, in turn, causes power to transfer to the low voltage motor 29, which rotates the low voltage motor 29 and completes the power transmission method.

Accordingly, embodiments disclosed herein relate to devices and methods useful for transferring power between devices, and controlling the flow of power between devices. Specifically, embodiments disclosed herein use a powered actuation mechanism that selectively actuates a series of contacts according to predetermined conditions such as the amount of power received from a power supply and/or the amount of time that a power supply fails to provide power. In contrast to a motor starter having a contactor, the selective actuation allows the contacts to remain connected through brief power losses, which allows the device to be electrically connected to the power supply even when the power supply is not transmitting electricity. This, in turn, allows the device to instantly operate once the power supply resumes providing electricity, without the need to manually reset the motorized mechanism. Moreover, a motor starter as described herein consumes less power than an MCP including a contactor, as the contactor must be continuously powered to transfer electricity from the power supply. On the other hand, a motorized mechanism including an electric actuator as described herein only needs to be powered while the electric actuator is actuating, and requires less overall power to actuate.

Although only a few example embodiments have been described in detail above, those skilled in the art will readily appreciate that many modifications are possible in the example embodiments without materially departing from this invention. Thus, all such modifications are intended to be included within the scope of this disclosure as defined in the following claims.

What is claimed is:
1. A device for transmitting power, the device comprising:
a Motor Circuit Protector (MCP) comprising:
    one or more contacts that electrically connect a power supply to a motor in a closed position, and disconnect the power supply from the motor in an open position;
    a voltage release element that is configured to determine a voltage of power supplied by the power supply;
a motorized mechanism, the motorized mechanism comprising:

a shaft that is fixed to each of the one or more contacts with a sliding pivot connection, a pin joint, or a bearing such that the shaft transfers linear motion to the contacts;

a controller that is electrically connected to the power supply, the controller being configured to process operating instructions and transfer the power to an electric actuator according to the operating instructions, wherein the electric actuator is configured to actuate the shaft upon receiving the power, and the shaft is configured to actuate the one or more contacts to the open position or the closed position, wherein the voltage release element is configured to retain the contacts in the closed position for a predetermined period of time when the voltage release element detects a voltage sag;

wherein the contacts are connected to the motor with a pivot connection such that the contacts are configured to rotate from the linear motion transferred by the shaft while the contacts remain connected to the motor, and wherein the motor is configured to rotate when the power supply is connected thereto.

2. The device of claim 1, wherein the electric actuator is an electric motor.

3. The device of claim 1, wherein the electric actuator is a solenoid.

4. The device of claim 1, wherein the one or more contacts are formed of a hardened or tempered metal.

5. The device of claim 1, wherein the contacts are configured to be actuated to the open position when the power supply outputs an amount of power that exceeds a predetermined upper limit.

6. The device of claim 1, wherein, after the predetermined period of time, the contacts are configured to be actuated to the open position.

7. The device of claim 1, wherein the contacts are configured to remain in the closed position when the power is within a predetermined upper limit and a predetermined lower limit.

8. The device of claim 1, wherein the contacts are configured to actuate to the open position during a total power loss.

9. The device of claim 1, wherein the MCP further comprises a ground protection element and an overload protection element.

10. The device of claim 1, wherein the device comprises a contactor-less motor starter.

11. A method for transmitting power, the method comprising:

supplying power from a power supply to a motorized mechanism, the motorized mechanism comprising:

a shaft fixed to one or more contacts of a Motor Circuit Protector (MCP) with a sliding pivot connection, a pin joint, or a bearing such that the shaft transfers linear motion to the contacts, an electric actuator, and a controller;

transferring power to the electric actuator according to operating instructions processed by the controller;

actuating the shaft using power supplied to the electric actuator, thereby actuating the one or more contacts to an open position or a closed position, the open position being a position in which the contacts electrically disconnect the power supply from a motor and the closed position being a position in which the contacts electrically connect the power supply to the motor, rotating the motor when the power supply is electrically connected thereto, determining a voltage of the power supplied by the power supply with a voltage release element of the MCP;

retaining the contacts in the closed position for a predetermined period of time, with the voltage release element, when the voltage release element detects a voltage sag; and connecting the contacts to the motor with a pivot connection such that the contacts rotate from the linear motion transferred by the shaft while the contacts remain connected to the motor.

12. The method of claim 11, further comprising: actuating the contacts to the open position when the power supply outputs an amount of power that exceeds a predetermined upper limit.

13. The method of claim 12, further comprising: retaining the contacts in the closed position when the amount of power output by the power supply is within a predetermined upper limit and a predetermined lower limit.

14. The method of claim 11, further comprising: actuating the shaft and the contacts to the open position after the predetermined period of time.

15. The method of claim 11, further comprising actuating the contacts to the open position during a total power loss.

16. The method of claim 11, wherein the MCP is part of a contactor-less motor starter.

* * * * *